(12) United States Patent
Vo et al.

(10) Patent No.: US 8,396,999 B2
(45) Date of Patent: Mar. 12, 2013

(54) INPUT/OUTPUT HOT SPOT TRACKING

(75) Inventors: Nhan Q. Vo, Cypress, TX (US);
Benjamin T. Allen, Cypress, TX (US);
Chiung-Sheng Wu, The Woodlands, TX (US); Stephen M. Schultz, Houston, TX (US); Jay E. Allison, Jr., Spring, TX (US); Mark L. Oelke, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/099,046

(22) Filed: May 2, 2011

(65) Prior Publication Data
US 2012/0284433 A1 Nov. 8, 2012

(51) Int. Cl.
*G06F 3/00* (2006.01)
*G06F 12/00* (2006.01)
*G06F 13/00* (2006.01)
*G06F 13/28* (2006.01)

(52) U.S. Cl. ............. 710/19; 710/15; 710/18; 711/118; 711/119

(58) Field of Classification Search .................. None
See application file for complete search history.

(56) References Cited

U.S. PATENT DOCUMENTS

| 6,339,818 | B1 | 1/2002 | Olszewski et al. | |
| 7,461,230 | B1 * | 12/2008 | Gupta et al. | 711/170 |
| 7,711,916 | B2 | 5/2010 | Chandrasekaran et al. | |
| 2001/0039597 | A1 * | 11/2001 | Senator | 709/325 |
| 2005/0155019 | A1 * | 7/2005 | Levine et al. | 717/127 |
| 2005/0155022 | A1 * | 7/2005 | DeWitt et al. | 717/131 |
| 2005/0240745 | A1 * | 10/2005 | Iyer et al. | 711/167 |
| 2009/0198748 | A1 * | 8/2009 | Ash et al. | 707/204 |
| 2010/0115211 | A1 | 5/2010 | de la Iglesia et al. | |
| 2010/0199036 | A1 * | 8/2010 | Siewert et al. | 711/112 |

OTHER PUBLICATIONS

Tara M. Madhyastha and Daniel A. Reed, Exploiting Global Input/Output Access Pattern Classification, http://portal.acm.org/citation.cfm?id=509602&dl=GUIDE&coll=GUIDE&CFID=110574025&CFTOKEN=64626619, Publication Date 1997, pp. 1-18.
Tara M. Madhyastha and Daniel A. Reed, Input/Output Access Pattern Classification Using Hidden Markov Models, https://portal.acm.org/purchase.cfm?id=266220.266226, Publication Date 1997, pp. 57-67.

* cited by examiner

*Primary Examiner* — Kris Rhu (57) ABSTRACT

A system having input/output hot spot tracking is disclosed. The storage system includes a storage device, a host controller coupled to the storage device, and a tracking engine coupled to the host controller and the storage device. The host controller is configured to managed input/output of the storage device. The tracking engine includes a storage map cycling between active status and passive status. Input/output commands are stored in the storage map during the active status. Like input/output commands in the storage map during active status are counted and compared to a number. Counts greater than the number are reported as input/output hot spots.

18 Claims, 5 Drawing Sheets

INPUT/OUTPUT HOT SPOT TRACKING

BACKGROUND

A hot spot in storage architecture is part of a data storage system that has high activity or is frequently accessed. The term "hot spot" can refer to data that is frequently accessed by a particular application or to frequently accessed data in a storage system that is shared by multiple applications. Often, hot spots present performance issues to the computer applications accessing hot spot data and the storage system storing hot spot data. Input/output (I/O) requests or commands are used to store data to a storage system and to retrieve data from the storage system. These I/O requests or commands incur latencies or delays while data is being written or retrieved. Since hot spot data is accessed frequently and the storage system incurs the same access latency each time the data is accessed, the aggregate delay associated with accessing hot spot data can lead to performance problems for the storage system. If such hot spots can be detected, the storage system can move this data to a faster storage medium, or other solution, in order to reduce access latency. Accordingly, storage architects and administrators attempt to reduce the effects of the hot spots in order to improve application and storage system performance.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
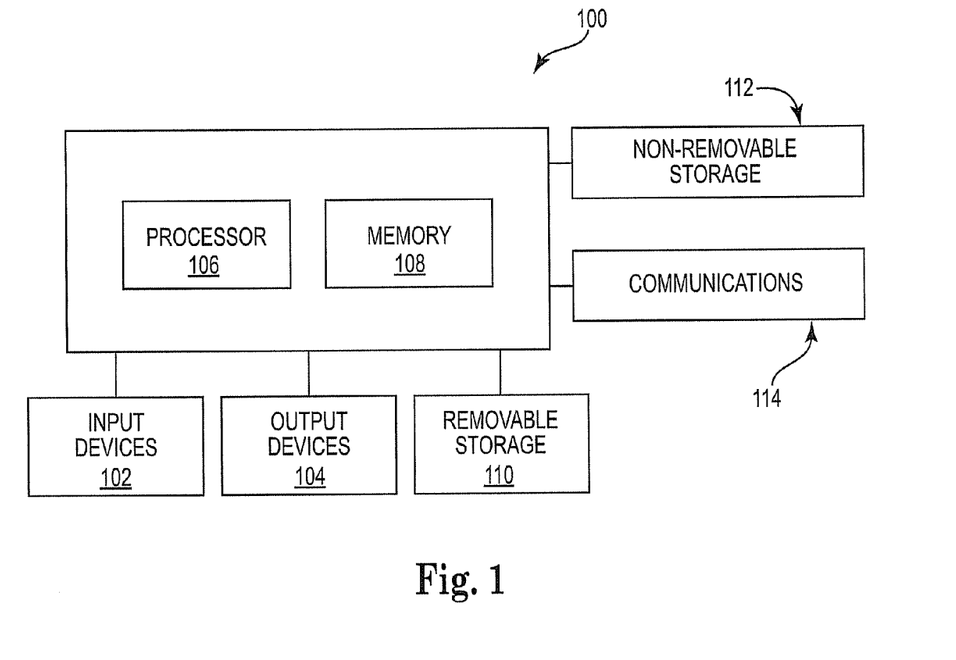
FIG. 1 is a schematic diagram illustrating an embodiment of a computing device.

FIG. 1 illustrates an embodiment of a computing device 100. The computing device 100 can be used to run applications that access data storage systems, to run applications that manage data storage systems, or to develop software programs to detect and reduce the number of hot spots in a storage system. In one example, the computing device 100 can include or can be coupled to one or more input devices 102, such as keyboard, pointing device (e.g., mouse), voice input device, touch input device, or the like. Computing device 100 can also include or can be coupled one or more output devices 104, such as a display, printer, or the like. In a basic configuration, computing device 100 typically includes a processor architecture having at least one processing unit, i.e., processor 106, and memory 108. Depending on the configuration and type of computing device, memory 106 may be volatile, non-volatile, or some combination of the two. The memory 108 can be arranged in a memory hierarchy such as a cache.

Computing device 100 can also include additional storage including, but not limited to, magnetic or optical disks or solid-state memory, or flash storage devices such as removable storage 110 and non-removable storage 112 for storage of information such as computer readable instructions, data structures, program modules or other data. The computing device 100 can be configured to run an operating system software program that can be stored on the storage media as well as one or more software applications, which make up a system platform. Memory 108, removable storage 110 and non-removable storage 112 are all examples of computer storage media that can be used to store the desired information and that can be accessed by computing device 100. Computing device 100 can also include one or more communication connections 114 that allow the computing device 100 to communicate with a network, such as a large area network or the Internet, on a bus coupling one or more components together, or other suitable connection. In the example shown, the computing device can be configured to access additional storage devices with one or more communication connections.

The description below describes a storage system and the use of an I/O hot spot tracking in the context of a storage system. Hot spot tracking as set forth in this disclosure can also be applied to track computer network traffic, frequently used sections of computer code or computer instructions, or other uses where access or use frequency is measured.

Figure 2:
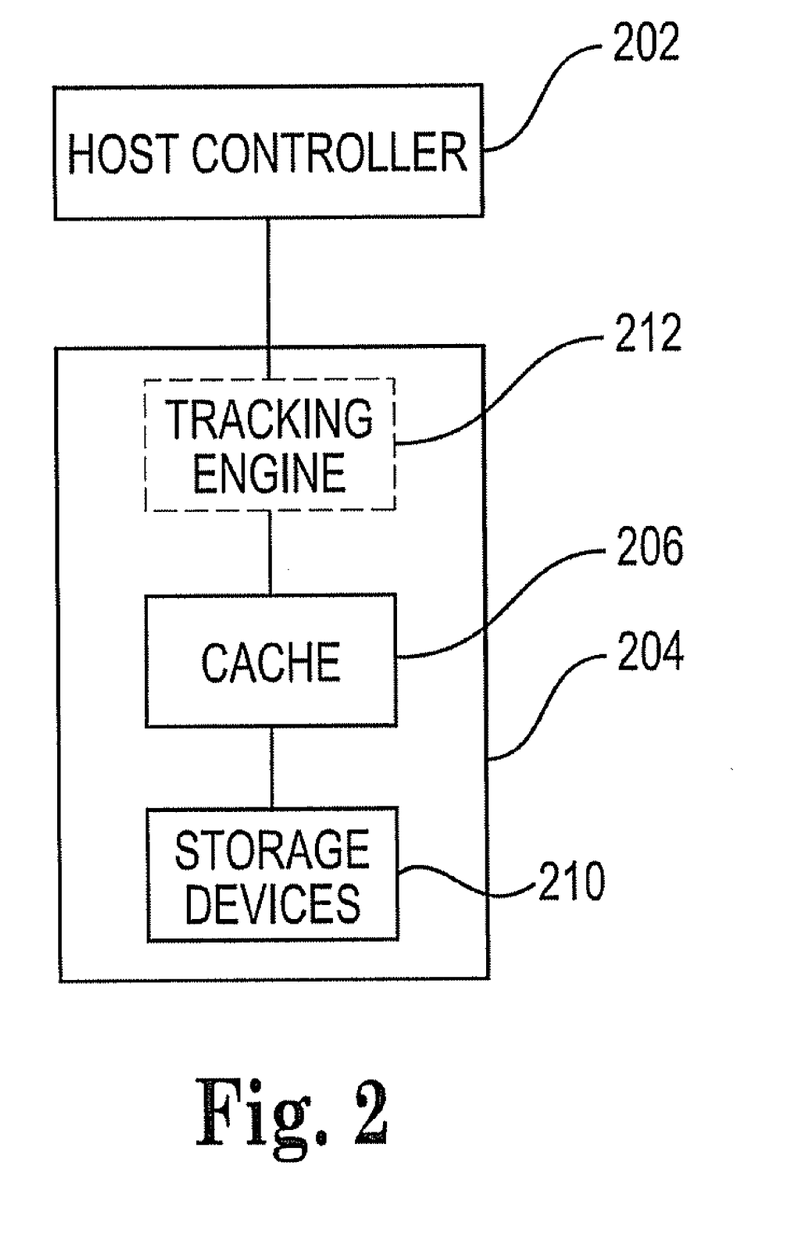
FIG. 2 is a block diagram illustrating an embodiment of a storage system for use with the computing device of FIG. 1 and including an embodiment of a tracking engine constructed in accordance with the disclosure.

FIG. 2 illustrates an embodiment of a storage system 200. The storage system 200 includes a host controller 202 and storage media 204. In one example, the host controller can include partial use of the processor 106 and the storage media 204 can include all or some part of the memory 108, removable storage 110, and non-removable storage 112 of the computing device 100. In other examples, the storage system 200 is coupled to the computing device 100 through one or more connections 114. The computing device can communicate with the storage system 200 directly, over a network, through a server, or other. The storage system 200 can include a Storage Area Network using Fibre Channel, or any other suitable storage network or devices. The host controller 202 can include one or more processors and memory for operation. In some examples, the processors and/or memory of the host controller 202 are dedicated to the storage system 200. The storage media 204 can include a cache 206, and one or more storage devices 210 that can be used to store data that can be accessed in applications. Also, one or more of the storage devices 210 can be configured into a logical volume, or the like, apart from other storage devices 210 or portions of a storage device 210. Data can flow between the host controller 202, cache 206, logical volume(s), and storage device(s) 210 in response to I/O commands.

A plurality of storage devices 210 can be selectively coupled together and configured to store data. In one example, the storage devices 210 can be configured in a RAID architecture, such as in one of any number of standard or non-standard levels. In other examples, the storage devices 210 can be configured in a non-RAID architecture or even in a later developed architecture outside the scope of a RAID architecture, and need not necessarily include redundancy. One example is a JBOD (Just a Bunch Of Disks) architecture. The storage devices 210 can include any type of suitable storage media such as tapes, magnetic hard disk drives, optical discs, solid state devices, and are not limited to any particular technology or groups of storage types.

In this example, the host controller 202 communicates with a tracking engine 212 to detect and report data accessed in the cache 206, logical volumes 208, storage devices 210, or other portions of a storage system. In one example, the tracking engine 212 detects and reports frequently accessed portions of the storage media 204, or storage system hot spots. This information can be used by a program running in the host controller 202, the computing device 100, or other, to analyze and optimize data access patterns in the storage system 200. This information can be used for such purposes as enhancing cache efficiency, optimizing I/O performance, generating reports or visualizations on access patterns, or modeling access patterns for simulations. Other storage system architectures including the tracking engine 212 are contemplated, and the tracking engine 212 and storage media 204 can include different configurations.

This tracking engine can be flexible in design and optional modes. For example, the tracking engine 212 can be configured to detect all I/O commands. In another example, the tracking engine 212 can be used to track only specific I/O activity, such as only tracking read commands, and can be re-configured at run time. The functionality and algorithm behind the system is the same, even with a limited application domain. If the tracking engine 212 is considered to be a layer within a larger system, it can be located between the host controller 202 and the storage media 204 (as shown), between an operating system and the host controller 202, or even inside the operating system or driver. In one example, the tracking engine 212 can be independent and reusable so that it can be easily added into a variety of existing storage systems 200. A further example of the tracking engine 212 can also be run in multiple, parallel instances (such as running one instance for each logical drive).

An example tracking engine 212 can provide an improvement in simplicity and accuracy over other tracking techniques. For example, the tracking engine is able to capture I/O status in real time with relatively straightforward arithmetic that is better suited for some processor architectures, such as RISC (Reduced Instruction Set Computer) architectures than the complex arithmetic used in previous hot spot detection algorithms. Further, the tracking engine 212 uses less memory resources than these complex techniques, which improves storage system 200 performance. The tracking engine 212 is also more accurate at detecting hot spots than other simple tracking techniques such as taking "snap shots" to record I/O patterns during a window of time. Further, the tracking engine 212 is as accurate but more versatile than the technique of tracking only a selected address range because the tracking engine 212 detects hot spots over the entire address range. These and other advantages are available in the embodiment of the tracking engine 212 and its features, which are described below.

The storage system 200, the tracking engine 212, or the described logical processes or methods can be implemented in devices, systems, or as software or firmware sometimes embodied in computer readable storage media including a set of computer readable instructions.

The logic process or method of the tracking engine is at times referred to in notations or computational operations. The data being processed can be described in terms of natural numbers when referring to storage addresses, access counts, and the like. The functions can be considered within this context. Further, some symbols and definitions that are used may have definitions particular to the domain of this context and may not possess the full set of properties of their abstract counterpart in the realm of pure mathematics. For the purposes of this disclosure, the following terms and notations are used:

1. The set of natural numbers is defined to be N={0, 1, 2 . . . } (i.e., the set of non-negative integers).
2. The notation x ∈ X indicates that the element x belongs to the set X. Also, x is an index address (or an address) within X.
3. Vectors are used here to represent I/O address ranges. Vector [a, b) (with a≦b) is a half-open interval in N such that {a,b,x ∈ N|a≦x<b}. Point "a" represents the beginning point and point "b" represents the end point of the vector [a,b). A set of vectors is denoted as V.
4. Step vector $[a,b)^N$ is a function F: V→N, with [a,b) ∈ V and N ∈ N. The notation N represents the height (or the count) of the step vector $[a,b)^N$. When applied to I/O access ranges, N can also be referred to as the height (or count) of each address x ∈ [a,b) and loosely represents the number of I/O accesses to addresses within the vector's range. In instances where there is no ambiguity, vector [a,b) can be denoted as the step vector N=1.
5. Two vectors are adjacent if they share one endpoint, i.e., [a,b) and [b,c). Two vectors intersect of overlap if there exists more than one point x such that x ∈ [a,b) and x ∈ [c,d).
6. The symbol "∞" refers to the largest address (or index address) of a particular storage system.
7. The sequence of step vectors $\{[a_0,b_0)^{N_0}, [a_1,b_1)^{N_1}, \ldots, [a_k,b_k)^{N_k}\}$ is contiguous if $b_i=a_i+1$ for all 0≦i<k. In the contiguous case, the sequence can be referred to with the shorthand notation $[a_1)^{N_1} \to [a_2)^{N_2} \to \ldots \to [a_k,b_k)^{N_k}$.
8. Min(a,b, . . . ,z) is defined as the minimum of the integers a,b, . . . ,z.
9. Max(a,b, . . . ,z) is defined as the maximum of the integers a,b, . . . ,z.
10. In the case of two step vectors $[a_1,b_1)^M$ and $[a_2,b_2)^N$: If $[a_1,b_1) \cap [a_2,b_2) = [x,y)$; where x<y (i.e., the vectors intersect) then combining the two step vectors $[a_1,b_1)^M$ and $[a_2,b_2)^N$ will generate the step vector $[x,y)^{M+N}$, which contains all addresses belonging to the original two vectors and has a height corresponding to the sum of the heights of the original two vectors.

A contiguous sequence of step vectors $\{[a_0,b_0)^{N_0}, [a_1,b_1)^{N_1}, [a_k,b_k)^{N_k}\}$, with $a_0=0$ and $b_k=\infty$, is referred as one instantaneous storage map (ISM) or one instantaneous storage status system. When applied to I/O access patterns, this sequence will cover the entire addressable range of the storage device or storage system 200. The null (empty) set is defined as Ø={ }, and $[a,a)^N=\emptyset$. Therefore, the disclosure assumes additional conditions within the ISM: $a_i<a_{i+1}$ where i=0, 1, 2, . . . ,k. In practice, the condition $a_1=0$ has a relative meaning. In one example, the entire storage volume is included in the map. In other examples, the map can be selected to monitor a selected storage area.

Figure 3:
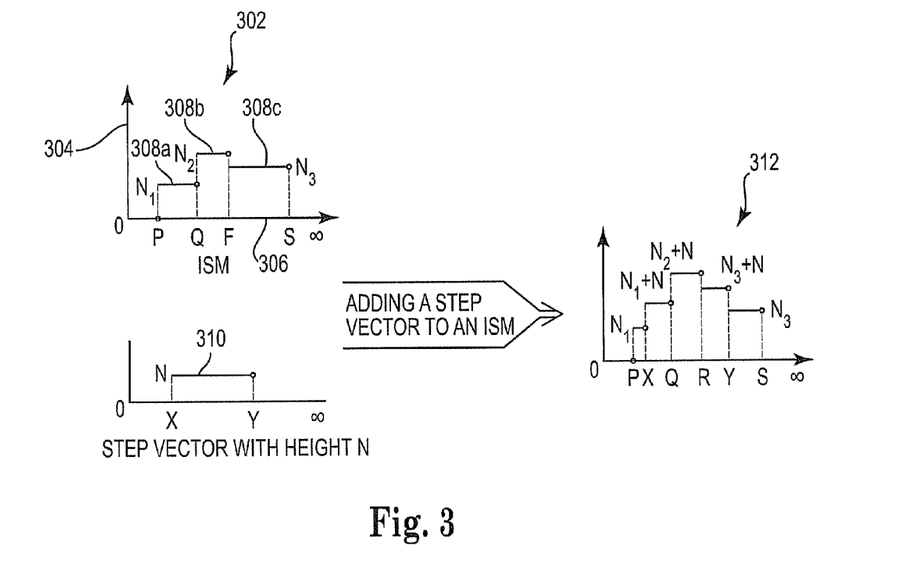
FIG. 3 is a graph illustrating an embodiment of combining vectors with the tracking engine of FIG. 2.

FIG. 3 illustrates a combination of vectors in an ISM with a step vector. A graph of an example ISM 302 is shown depicting height 304 over address range 306 at time $t_0$. The example ISM 302 includes three vectors 308a, 308b, and 308c. Vector 308a includes a height $N_1$, vector 308b, includes a height $N_2$, and vector 308c includes a height $N_3$. Vector 308a includes a starting point at address p and an ending point at address q. Vector 308b includes a starting point at address q and an ending point at address r. Vector 308c includes a starting point at address r and an ending point at address s. Thus, vectors 308a, 308b, and 308c can be represented as $\{[p,q)^{N_1}, [q,r)^{N_2}, [r,s)^{N_3}\}$.

FIG. 3 also illustrates a graphical representation of vector 310 having a starting point x, an ending point y, and a height N, which can be represented as $[x,y)^N$. In the example, p<x, x<q, r<y, and y<s. When the step vector 310 is added into the example ISM 302, the result is shown graphically in ISM 312, which is at time $t_1$. All addresses within the range x and y [x,y) are increased in height. Accordingly, the vector sequence of ISM 312 can be represented as $\{[p,x)^{N_1}, [x,q)^{(N_1-N)}, [q,r)^{(N_2+N)}, [r,y)^{(N_3-N)}, [y,s)^{N_3}\}$.

An ISM can be used for I/O commands, which can be represented with vector operations. Each I/O command can be represented by an address ("LBA") and a length ("LEN"). An I/O command can be described with a vector [a,b), where a=LBA and b=(LBA+LEN+1). In this example, vectors are combined to form an ISM. An example system has an empty ISM $\{[0,\infty)^0\}$ and issues two I/O commands, $[a_1,b_1)$ and $[a_2,b_2)$, $a_1 \leq a_2$. These two commands can affect an ISM in four different ways. In a first way, commands access the same range such that the step vector $[a,b)^2$ represents the aggregation of these two commands. The resulting ISM would be $\{[0,a)^0, [a,b)^2, [b,\infty)^0\}$. In a second way, commands share an end point such that $b_1=a_2$. Because the two vectors have the same access counts in this example, they will be concatenated into one and the ISM would be $\{[0, a_1)^0, [a_1, b_2)^1, [b_2,\infty)^0\}$. In a third way, commands intersect such that $b_1>a_2$. The two vectors will be split into three, e.g. one representing the intersection of the two and two representing the points unique to either original vector. The ISM would be $\{[0,a_1)^0, [a_1,b_1)^1, [b_1, a_2)^2, [a_2,b_2)^1, [b_2,\infty)^0\}$. In a fourth way, the commands are distinct such as in $b_1<a_2$. The vectors cannot be combined, and the ISM would be $\{[0,a_1)^0, [a_1,b_1)^1, [b_1, a_2)^0, [a_2,b_2)^1, [b_2,\infty)^0\}$.

Each I/O command is processed and converted into a vector. The vector is added into the ISM using the vector operations. After a vector is added or modified, it is compared against the vectors adjacent to it. If an adjacent vector has the same height as the modified vector, the two can be concatenated into a single vector without adverse effect. This helps keep the ISM as simple as possible and reduces memory usage.

A linked list can be used to implement the ISM (abbreviated as LLISM). Each node of the linked list represents a step vector and includes a data structure having four values: a starting address, a height value, and pointers to the previous and next nodes in the list. In one example, the list is kept sorted. Vectors are half-open intervals so in one example the end point of a vector is not stored because the end point of one vector is equal to the starting point of the next vector. In this example, the final list element also does not have an ending point specified in the list, so the system keeps track of the highest possible address in a separate variable. The data types used to represent these values should be chosen based on the range of values they will be expected to hold, keeping in mind that using smaller data types can significantly reduce the system's memory overhead.

The following pseudo-code describes recording and building a step vector linked list. For example, to add a new I/O vector $[x,y)^N$ into the ISM:

* Traverse i=0; i++; until node[i].address<=x<node[i].next→address;
* If (node[i].address<x) then Insert new Node with address x and count (node[i].count+N) after this one
*Traverse j=i; j++; until node[j].address<y<=node[j].next→address
{
   for each node[j], node[j].count+=N;
}
* If (y<node[j].next→address) then insert new Node with address y and count (node[j].next→count) after this one
* Inspect all nodes added or modified, and merge them with adjacent nodes if count values are equa This method embodied as code can be used when recording all interesting nodes from a passive LLISM into a long_term_mem, which is described below.

Memory constraints typically prevent the LLISM from containing data for all I/O transactions from a given starting time or event such as system power up. Given that the ISM is implemented as a linked list of data structures, this memory constraint is typically a fixed-size pool of pre-allocated nodes. Multiple alternating step vector linked lists can be used to avoid this limitation.

Figure 4:
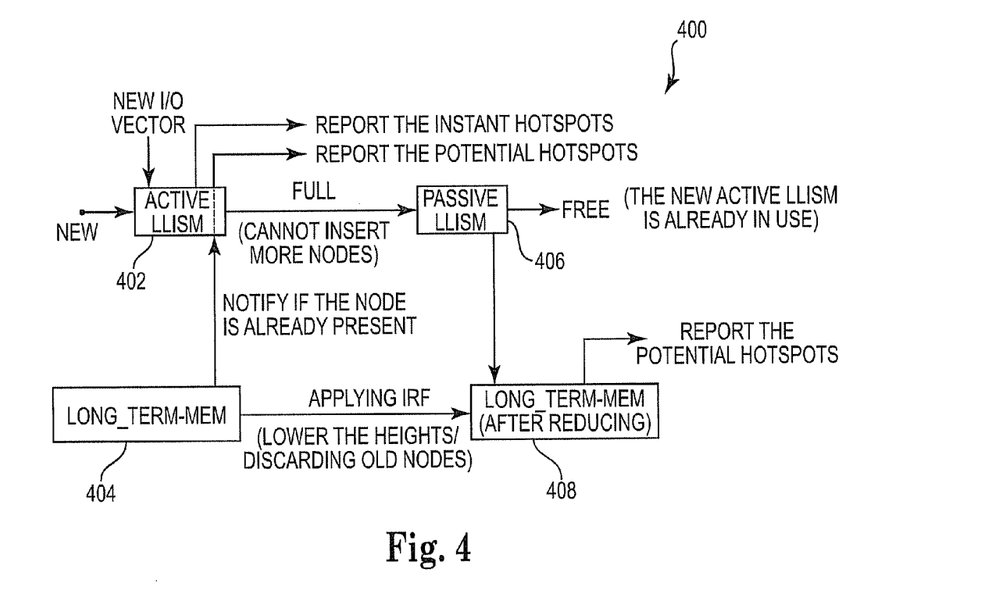
FIG. 4 is a block diagram illustrating an embodiment of a life cycle for a feature of the tracking engine of FIG. 2.

FIG. 4 illustrates an example life cycle of multiple alternating LLISMs 400 and their interactions with I/O commands in the tracking engine 212. For example, instead of using a single, large LLISM, two LLISMs, i.e., one active LLISM 402 and one passive LLISM (not shown), are created as well as a separate data table named long_term_mem 404. Table 404 can also be a LLISM, and its capacity may be less than or equal to the active LLISM 402 and the passive LLISM. The active LLISM 402 or short_term_mem will record all incoming I/O operations as nodes, up to a total of MAX_NODES. Once the active LLISM 402 has MAX_NODES number of nodes in the list, the LLISM 402 can be considered to be a "full LLISM." An LLISM can also be considered full if the access counter for any of its nodes reaches the maximum value supported by the chosen data type. Once the active LLISM 402 is full, it will become the new passive LLISM 406 and the passive LLISM (not shown) will become the new active LLISM (not shown). Going further, the active LLISM 402 and the passive LLISM will alternate functions whenever the current active LLISM becomes a full LLISM.

All "interesting" nodes from the new passive LLISM 406 will be recorded in the long_term_mem 404. Nodes are determined to be "interesting" based on their height and width, both as an absolute measurement based on, for example, predetermined criteria and as a relative measurement compared to the data already stored in the long_term_mem 404. Once all of the interesting information from the passive LLISM 406 are filtered out and recorded to the long_term_mem 404, the new passive LLISM 406 will be cleared and reset to the empty list $\{[0)0\}$, awaiting its turn to become the new active LLISM. In this example, the active LLISM 402 can record I/O operations concurrently with the passive LLISM supplying the long_term_mem 404 and emptying the list.

Each time a passive LLISM such as new passive LLISM 406 begins to record its data into long_term_mem 404, the access counts for the data already stored in long_term_mem 404 will be reduced by a factor referred to as the "Impressiveness Reducing Factor" (IRF) and then becomes a long_term_mem after reducing at 408. Applying the IRF lowers the vector heights and discards old nodes. The impact of data slowly decays over time, and old data will eventually decay to zero and the associated nodes will be removed. The purpose of the IRF is both to limit the memory usage of long_term_mem 404 and to place more importance on recent performance trends than trends in the distant past.

To reduce the overhead associated with the required calculations, the maximum number of nodes stored in long_term_mem 404 can be limited to a selected amount. The particular limitations imposed will depend on the capabilities of the device that will be processing the data.

Over time, many unique LLISMs will be processed (let n be the total number of LLISMs processed). The newest LLISM (i.e, the current active LLISM) is denoted $LLISM_1$. The previous LLISM (i.e., the current passive LLISM) is denoted $LLISM_2$. The current active LLISM before it was integrated into long_term_mem and reset is denoted $LLISM_3$, etc, continuing back to the first LLISM processed which is denoted $LLISM_n$.

When using multiple alternating and relatively small LLISMs, $F(x)=F_1(x)+F_2(x)+F_3(x)+ \ldots +F_n(x)$; where $F_r(x)$ is the access counter values for address x from $LLISM_r$. This represents a case of superposition of the function F that can be calculated by summing all $F_i$ where i=(1, 2, ... n). In typical systems with relative memory constraints, an indirect method can be used to detect hot spots. As described above, interesting data points are recorded into long_term_mem 404. When a new passive LLISM 406 is to be recorded into long_term_mem 404, and the access counters of all existing nodes will be reduced via the IRF. The definition of F(x) becomes a form of pseudo-superposition: $F(x)=a_1F_1(x)+a_2F_2(x)+a_3F_3(x)+ \ldots +a_nF_n(x)$ with $a_1, a_2, \ldots, a_n$ a sequence of decreasing factors. For instance, the decreasing factors have values of $a \leq 1$. In one particular example, the sequence can be implemented as a decreasing geometric progression $\{1, \frac{1}{2}, \frac{1}{4}, \frac{1}{8} \ldots\}$. Other examples can include more complex criteria based on, for example, the time required to fill each alternating LLISM. As more data is recorded, hot spots can be determined by processing the aggregated data available in long_term_mem 404.

Hot spots are related to I/O state. Precise criteria used to define a hotspot will vary depending on system configuration and a myriad of other implantation-specific and workload-specific factors. Generally, however, nodes can be considered to be hotspots if the nodes include higher access counts than a typical node in the list. In one example, the height of a hot spot node exceeds the average height of the other nodes by a pre-determined margin. Typically, the height difference is significant enough to clearly indicate that that the node is not simply a small, short-term variation from the norm, which may lead to certain data regions being constantly swapped between "hot spot" and "not a hot spot" classification. Depending on how a particular application treats hot spots, this may cause a large number of unneeded data transfers. Depending on the particular implementation, I/O patterns expected, and memory constraints imposed on a system, the number of hot spot nodes also can be limited to a amount such as to the, for example, five hundred twelve highest nodes or to nodes with heights greater than, for example, 80% of the largest height. The term "Potential Hot Spot" refers to a set of nodes in the active or passive LLISM with relatively high access counters and existing entries in long_term_mem, which can indicate that the I/O pattern has a long-term hot spot. That is, the data is repeatedly accessed over a period of time that encompasses multiple LLISMs (e.g., a server flushing log file to disk every few seconds). In one example, the access counts can be evaluated against a selected number such as potential_hotspot_height. The relatively lower height of the node's entry in long_term_mem indicates the longer wavelength of the repeating access pattern. In one example, the height of the nodes can be evaluated against a selected height such as a long_term_lower_limit_height. In determining criteria based on counts, percentages, or the like, the numbers used can be static or dynamic and enabled to be varied as the tracker receives more information on hot spots.

An application can utilize aggregated hot spot data developed above in one or more of several examples, some of which are listed here and others can be contemplated in view of this disclosure. In one example of a method to retrieve information about the I/O operations currently being handled (i.e., a snapshot covering a window extending into the recent past) is to capture a full LLISM as it transitions from active to passive. This technique can be termed "Current State of System I/O." The complete history for the relevant time period will be included (however, there will likely be some degree of latency between a snapshot request and the next LLISM filling up). An application can capture a series of these snapshots and use them to generate a graphical representation of data access patterns over time. In another example, a technique can deliver a set of nodes that have particularly high access counters at a specific instant in time. This technique can be termed "Instantaneous Hot Spot." In one example, the access counters are determined from the currently active LLISM. Nodes that have higher access counters than the nodes around them can be considered as possible hot spots.

Creating useful actions from translating the information gathered by this system can be done in many application-specific ways. For example, how to treat hot spots with very high access counters that represent a narrow address range (data possibly eligible for caching) vs. hot spots with slightly lower access counts but larger address ranges (possibly copy to a high-performing storage device, e.g. a Solid State Drive). Values such as MAX_NODES, instant_hot_spot_height, impress_level_height, longterm_lower_limit_height, potential_hot_spot_height, and the IRF factor can be optimized based on factors such as available memory, CPU capabilities, where this system fits into the layers of the application as a whole, and the nature of the host I/O.

Figure 5:
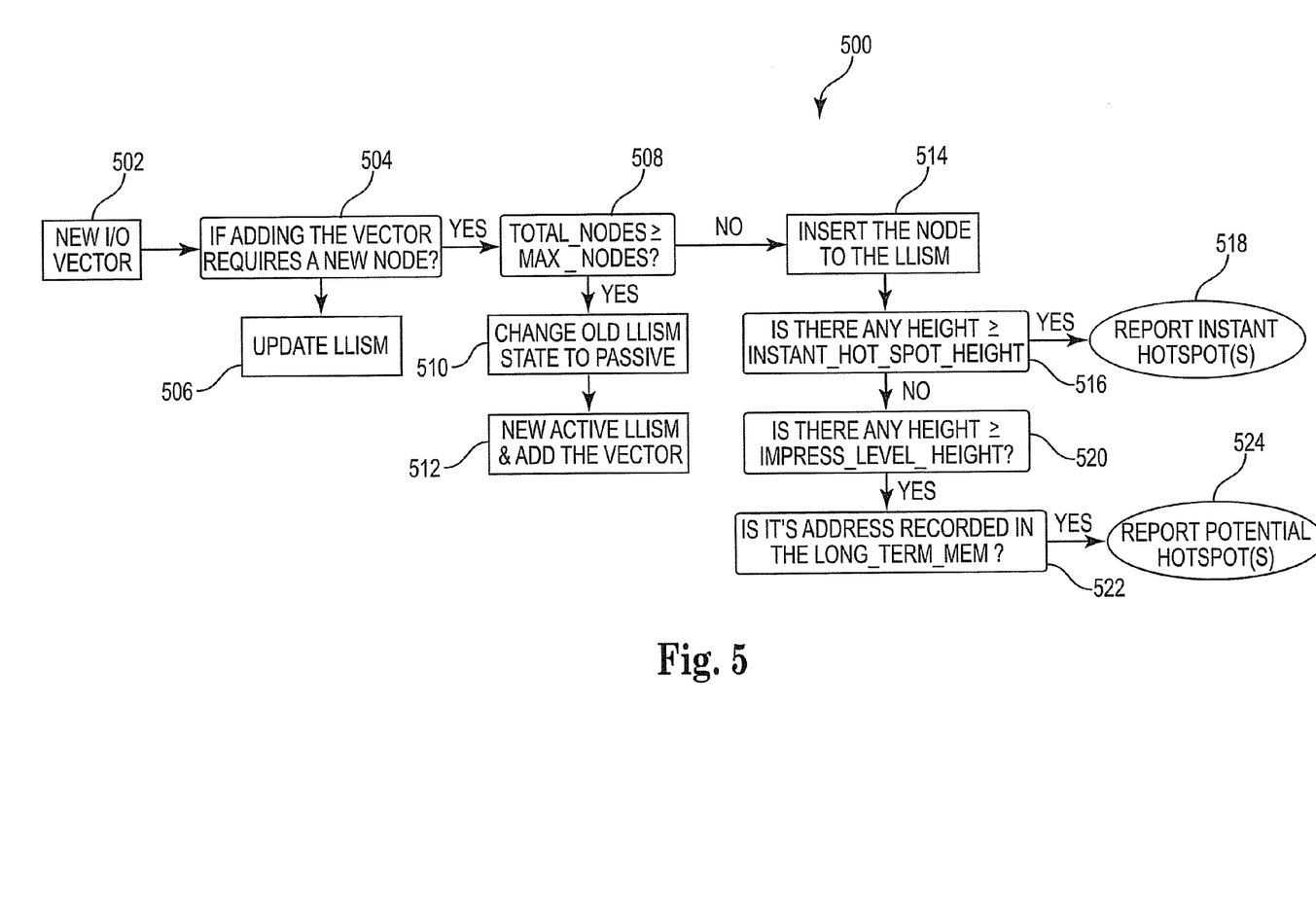
FIG. 5 is a flow diagram illustrating an embodiment of a process of the lifecycle of FIG. 4.

FIG. 5 illustrates an example method 500 to report hot spots in an active ISM such as active LLISM 402 in the tracking engine 212. A new I/O vector is received at the ISM at 502. A determination is made as to whether the new I/O vector creates a new node in the ISM at 504. If no new node is created at 504, the ISM is updated and the method 500 is terminated at 506. The method 500 will resume once a new I/O vector is received. If a new node is to be created at 504, a determination is made as to whether the number of nodes in the ISM has reached a selected maximum number of nodes (MAX_NODES) at 508. If the selected maximum number has been reached at 508, the active ISM changes places with the passive ISM at 510, and the I/O vector is recorded in the new active ISM at 512. The method 500 resumes when a new I/O vector is received. If the maximum number has not been reached at 508, the node is inserted into the active ISM at 514. A determination is made as to whether a height in the active ISM is greater than or equal to a selected number used to determine an instant hot spot (instant_hot_spot_height) at 516. If so, then an instant hot spot is reported at 518. If none of the heights are greater than or equal to the selected number at 516, a determination is made as to whether there is a height in the active ISM that is greater than a selected number of access counts such as an impress_level_height at 520. If not, the method resumes when a new I/O vector is received. If a height is greater than the impress_level_height at 520, then a determination is made as to whether an address of the vector is in long_term_mem at 522. If yes, the method 500 reports a potential hot spot at 524.

Figure 6:
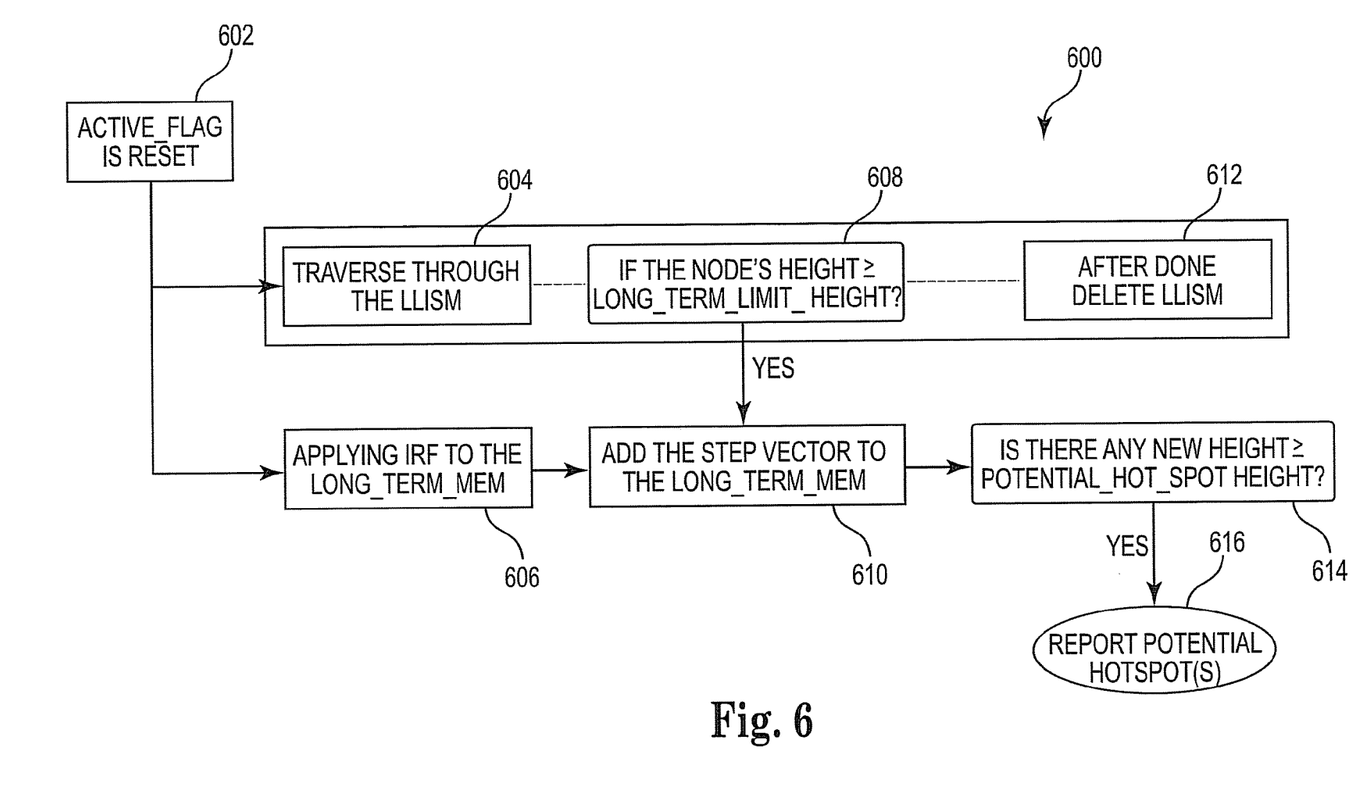
FIG. 6 is a flow diagram illustrating an embodiment of another process of the life cycle of FIG. 4.

FIG. 6 illustrates an example method 600 to report potential hot spots after the active ISM becomes a passive ISM in the tracking engine 212. For example, an active ISM that becomes a passive ISM will reset an active flag to indicate that the ISM has become a passive ISM at 602. In a first path, the passive ISM is traversed at 604. Also, an IRF is applied to the long_term_mem at 606. The method determines if any nodes in the passive ISM has a height that is greater than or equal to the long_term_lower_limit_height at 608. If so, than the associated step vectors are added to long_term_mem at 610. The corresponding nodes can be removed from the passive ISM at 612. The method determines whether any height in the long_term_mem is greater or equal to the potential_hot_spot_height at 614. If so, the corresponding nodes are reported as potential hot spots at 616.

Defining an IRF depends on factors such as memory constraints, processor capabilities, and LLISM capacity. One method is to implement the IRF as a fixed constant that is easily computable for the current processor architecture while ensuring that long_term_mem stays within the memory constraints. More complex algorithms can be used and often benefit from more processing power or a dedicated processor core and more memory. Another method is based on the length of time that the short_term_mem was kept until it is full such as the life time T of the active LLISM. A relatively small T indicates a short-duration I/O spike and may or may not use the same weight given to a LLISM filled over a much longer interval. One design strategy for building the tracking engine 212 is to keep the IRF small enough to limit the capacity of long_term_mem at a reasonable level based on system resources.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A hot spot tracking system, comprising:
   a storage device;
   a host controller operably coupled to the storage device and configured to managed input/output of the storage device; and
   a tracking engine operably coupled to the host controller and the storage device, wherein the tracking engine includes a storage map cycling between active status and passive status when the storage map in active status has reached a capacity amount, wherein input/output commands are stored in the storage map during active status, and wherein a current storage map in active status becomes a new storage map in passive status and is emptied, and wherein a current storage map in passive status becomes a new storage map in active status and is filled with input/output commands;
   wherein like input/output commands in the storage map during active status are counted and compared to a number, and wherein counts greater than the number are reported as hot spots.

2. The hot spot tracking system of claim 1 further comprising a plurality of storage devices wherein at least one of the plurality of storage devices is selected from the group: a magnetic hard disk drive, an optical disc, and a solid state device.

3. The hot spot tracking system of claim 1 wherein the input/output command is described as a step vector including an address and a length.

4. The hot spot tracking system of claim 3 wherein a node in the storage map represents the step vector and includes a data structure having the values of a starting address, a height value, and pointers to a previous node and a next node in the storage map.

5. The hot spot tracking system of claim 1 wherein the tracking engine is a layer between the host controller and the storage device.

6. The hot spot tracking system of claim 1 wherein the maps are configured as linked lists in a memory.

7. The hot spot tracking system of claim 6 wherein the memory is included in the host controller.

8. The hot spot tracking system of claim 1 wherein the input/output storage commands include addresses, wherein the number is a pre-selected number, and wherein each like address is counted and compared to the pre-selected number.

9. The hot spot tracking system of claim 1 wherein the system is a storage system.

10. The hot spot tracking system of claim 3 and wherein a current storage map in passive status becomes a new storage map in active status and is filled with vectors.

11. The hot spot tracking system of claim 1 wherein the maps are linked lists created in memory.

12. A method of tracking input/output hot spots, comprising:
    receiving, in a memory, new input/output information into a node of an active map;
    comparing, with a processor, an amount of received input/output information having a like address in the node against a first number;
    reporting, with the processor, a first hot spot type if the amount is greater than the first number;
    converting the active map to a passive map in the memory when the active map is full of nodes;
    writing selected nodes from the passive map into the memory; and
    reporting, with the processor, a second hot spot type if the amount of selected nodes having the like address is greater than a second number, wherein the second number relates to a potential hotspot height.

13. The method of claim 12 wherein the input/output information is sorted into nodes by address.

14. The method of claim 12 wherein the first number relates to an instant hot spot height.

15. The method of claim 12 further comprising removing nodes from the memory if an amount of node to be removed is less than a third number.

16. The method of claim 12 wherein the active map and the passive map are linked lists.

17. A non-transitory computer readable storage medium storing computer executable instructions for controlling a computing device to perform a method comprising:
    receiving new input/output information into a node of an active map;
    comparing an amount of received input/output information having a like address in the node against a first number;
    reporting a first hot spot type if the amount is greater than the first number;

converting the active map to a passive map when the active map is full of nodes;
writing selected nodes from the passive map into a memory;
reporting a second hot spot type if the amount of selected nodes having the like address is greater than a second number; and
removing nodes from the memory if an amount of node to be removed is less than a third number.

18. The computer readable storage medium of claim 17 wherein the method is implemented as a layer between a host controller and a storage device in a storage system.

* * * * *